(12) United States Patent
Ayers et al.

(10) Patent No.: US 8,537,241 B2
(45) Date of Patent: Sep. 17, 2013

(54) IMAGE SENSOR WITH SENSITIVITY CONTROL AND SENSITIVITY BASED WIDE DYNAMIC RANGE

(75) Inventors: Tom Ayers, San Jose, CA (US); Chris Adams, Saratoga, CA (US); Justin Reyneri, Los Altos, CA (US); Jinsuk Kang, Palo Alto, CA (US); John Monti, Los Gatos, CA (US)

(73) Assignee: PIXIM, Inc., Mountain View, CA (US)

( * ) Notice: Subject to any disclaimer, the term of this patent is extended or adjusted under 35 U.S.C. 154(b) by 376 days.

(21) Appl. No.: 12/788,248

(22) Filed: May 26, 2010

(65) Prior Publication Data
US 2010/0302407 A1    Dec. 2, 2010

Related U.S. Application Data

(60) Provisional application No. 61/182,048, filed on May 28, 2009.

(51) Int. Cl.
*H04N 5/235* (2006.01)
*H04N 5/335* (2011.01)
*H04N 3/14* (2006.01)

(52) U.S. Cl.
USPC ........................................ 348/229.1; 348/308

(58) Field of Classification Search
USPC ................. 348/229.1, 230.1, 308, 301, 216.1
See application file for complete search history.

(56) References Cited

U.S. PATENT DOCUMENTS

| | | | | |
|---|---|---|---|---|
| 6,310,571 B1 * | 10/2001 | Yang et al. | ..................... | 341/155 |
| 7,742,082 B1 * | 6/2010 | Martel | ........................ | 348/229.1 |
| 7,746,252 B2 * | 6/2010 | Mizuta | ........................... | 341/118 |
| 7,781,719 B2 * | 8/2010 | Yang et al. | ................ | 250/214 R |
| 8,441,535 B2 * | 5/2013 | Morin | ........................... | 348/148 |
| 2005/0057666 A1 * | 3/2005 | Hu et al. | .................... | 348/229.1 |
| 2005/0231622 A1 * | 10/2005 | Furukawa | .................... | 348/308 |
| 2007/0007434 A1 * | 1/2007 | Pain | ........................... | 250/208.1 |
| 2008/0055426 A1 * | 3/2008 | Pertsel et al. | ............. | 348/223.1 |
| 2009/0225189 A1 * | 9/2009 | Morin | ........................ | 348/229.1 |
| 2012/0099011 A1 * | 4/2012 | Chevallier | ..................... | 348/308 |
| 2012/0307107 A1 * | 12/2012 | Brunner | ..................... | 348/229.1 |

OTHER PUBLICATIONS

Johannes Solhusvik et al., "A 1280×960 3.75μm pixel CMOS imager with Triple Exposure HDR," white paper, 4 pages, Jun. 2009.
Boyd Fowler et al., "Wide Dynamic Range Low Light Level CMOS Image Sensor," 2009 International Image Sensor Workshop Paper 48, pp. 1-4.
MT9V022I77ATM (mono), MT9V022I77ATC (color) Data Sheet, "1/3-Inch, Wide-VGA CMOS Digital Image Sensor," Micron Technology, Inc., pp. 1-15, 2006.

* cited by examiner

*Primary Examiner* — John Villecco
(74) *Attorney, Agent, or Firm* — Rader, Fishman & Grauer PLLC

(57) ABSTRACT

In one embodiment, a method for sensing an image of a scene includes receiving incident light at a image sensing device including an array of at least two regions of pixel elements, providing one or more control parameters where each of the control parameters modifies the sensitivity of the pixel elements, generating control signals for the one or more control parameter for each region of pixel elements where the sensitivity of the pixel elements is varied on a region by region basis. In another embodiment, method for sensing an image of a scene includes generating control signals for controlling two or more control parameters for controlling the pixel elements of an entire array to provide continuous fine grain control of the sensitivity of the pixel elements.

33 Claims, 8 Drawing Sheets

IMAGE SENSOR WITH SENSITIVITY CONTROL AND SENSITIVITY BASED WIDE DYNAMIC RANGE

CROSS-REFERENCE TO RELATED APPLICATIONS

This application claims the benefit of U.S. Provisional Patent Application Ser. No. 61/182,048, filed on May 28, 2009, which application is incorporated herein by reference in its entirety.

FIELD OF THE INVENTION

The invention relates to image sensors and, in particular, to image sensors implementing fine sensor sensitivity control and region-by-region sensitivity control for achieving wide dynamic range.

DESCRIPTION OF THE RELATED ART

There are three major image sensor architectures in commercial use today including the CCD (Charge Coupled Device), the CMOS APS (Active Pixel System) image sensor, and the DPS (Digital Pixel Sensor). The basic characteristics of these architectures are as follows. First, CCD architecture performs photon reception and conversion to electrons in the pixel and then packets of electrons are moved out of the pixel array via a buried channel. In the CCD architecture, charge-to-voltage conversion, gain, and analog-to digital-conversion (ADC) occur outside of the pixel array, whether in the same integrated circuit (IC) device or in a separate and connected IC device.

Second, CMOS APS architecture performs photon reception, conversion to electrons, and charge-to-voltage conversion in the pixel and then an analog voltage is transmitted out of the pixel array where additional gain and analog-to-digital conversion occur. Finally, DPS architecture performs photon reception, conversion to electrons, charge-to-voltage conversion, gain, and analog-to-digital conversion all in the pixel prior to transmitting a digital number (or digital binary digits) out of the pixel array for further processing.

Current schemes for image sensing use a basic image sensing system such as that shown in FIG. 1. Referring to FIG. 1, a basic image sensing system 10 consists of a photodiode D0 for integrating incident light, a capacitor C0 for charge to voltage conversion, and an ADC (Analog-to-Digital Converter) 12 for voltage to digital data conversion. Capacitor C0 can consist of any combination of actual capacitor structures plus parasitic node capacitance. The basic image sensing system 10 is often embodied in both the pixel and the surrounding circuitry of a digital imaging system. More specifically, photodiode D0 receives photons of light and converts the incident light to electrons. Capacitor C0 integrates the electrons at the sense node 14 and converts the electrons to a voltage reading. Finally, the ADC 12 converts the voltage reading to digital numbers (DN) where the digital numbers are indicative of a digital image sensed by the photodiode D0.

The photodiode D0, capacitor C0 and the ADC 12 are the key elements in system 10 for realizing image sensing. In addition to these elements, an image sensing system may include other elements, such as a reset transistor T1 to reset the photodiode D0 and precharge the capacitor C0 and a transfer gate T2 to isolate the photodiode during light exposure. Reset transistor T1 receives a Reset signal as the gate control signal. Transfer gate T2 receives a TG signal as the gate control signal. A reset circuitry is typically included in most image sensing system design. In addition to the elements shown in FIG. 1, an image sensing system may include other control circuitry (not shown) for facilitating image sensing or reading of the sensed data, as is well known in the art. Examples of other control circuitry includes exposure control, iris control, and focus control.

The maximum number of electrons detectable by a pixel is known as the "well capacity" or "full well" of the pixel. This number can be limited by the charge storage size of the photodiode, the sense node, the voltage swing of the readout circuitry, or limited by the highest digital number which can be generated by the ADC. In general, the sensor is designed such that the ADC cuts off prior to the actual saturation of the photodiode or sense node, to maximize response linearity and minimize process variations. The ADC can convert voltages over a range of input voltages to a corresponding range of digital numbers from the lowest digital number to the highest digital number. The basic image sensing system may sometimes include gain adjustments before the ADC to allow the ADC to operate with higher digital numbers in lower light levels or to adjust for color channel gain differences in color reproducing image sensors. These gain adjustments often include choosing the size of the capacitor C0 for the charge-to-voltage conversion (often referred to as the "conversion gain"), providing fixed or variable gain analog amplifiers, and selecting the operating voltage range of the ADC.

In operation, the basic image sensing system resets the photodiode D0 and the capacitor C0 and exposes the photodiode for a fixed period of time (often called the integration time or shutter speed) to generate a number of photon induced electrons. The capacitor C0 in the basic image sensing system converts the electrons to a voltage. The basic image sensing system applies a gain to that voltage, and finally converts that voltage to a digital number with a fixed operating range ADC.

The basic image sensing system 10 in FIG. 1 includes a single photodiode to illustrate one pixel of an image sensing device. In actual implementations, an image sensing device, or an image sensor, includes multiple photodiodes formed in an one or two dimensional pixel array. In those cases, some elements of the basic system are duplicated to form the line or array image sensing device. For instance, the entire line or the entire array may use a single ADC, or one ADC is provided for each color channel. Other configurations may include providing one ADC per column of the pixel array, or one ADC per pixel. While the implementation of a pixel array is more complex, the logical connection for each pixel remains the same as the basic image sensing system 10 of FIG. 1. The basic image sensing system 10 of FIG. 1 is therefore representative of the logical connections of a pixel in a pixel array.

The pixel array of an image sensing device can be tuned for operation in a given environment. Conventional techniques for tuning the pixel array involve adjusting a single parameter between predetermined fixed values and applying the adjustments to the entire pixel array. Examples of parameters that can be tuned include the photodiode size, the size of capacitor C0 for charge-to-voltage conversion which is equivalent to changing the conversion gain, the analog gain prior to ADC, and the ADC operating voltage range.

The dynamic range of the an image sensing system is determined by the signal to noise level of the system which often is determined by the signal to noise ratio of the pixel. With digital post processing, the signal to noise ratio can, in some cases, be lowered to the signal to quantization noise limit of the ADC.

Wide Dynamic Range processing ("WDR," also known as "High Dynamic Range processing") is often accomplished by changing one variable for the whole pixel array of an image sensing device. This provides an extension of the dynamic range of the image sensing device. For instance, WDR processing can be achieved using various methods, including using multiple photodiodes per pixel (typically two), using multiple non-destructive reads of the pixel, using multiple resets and reads of the pixel, using multiple capacitor values (typically two) for charge-to-voltage conversion, using multiple exposure times/shutter speeds for the pixel, using multiple analog gain values applied to the analog voltage of the charge-to-voltage conversion process, using multiple ADC operating voltage ranges for converting the analog voltage to digital values, and using pixel biasing to achieve logarithmic output characteristics. Conventional dynamic range enhancement techniques have many shortcomings, including degradation in signal-to-noise ratio and increased implementation complexity.

SUMMARY OF THE INVENTION

According to one embodiment of the present invention, a method for sensing an image of a scene including receiving incident light at an image sensing device where the image sensing device includes an array of pixel elements and the array includes at least two regions of pixels elements with each region including one or more pixel elements; providing one or more control parameters where each control parameter modifies the sensitivity of the pixel elements in the array; generating one or more control signals where each control signal varies a control parameter for a given region of pixel elements of the array and the one or more control signals are generated to vary the sensitivity of the pixels elements on a region by region basis within the array in accordance with the scene; and generating output signals at the output of the image sensing device indicative of the pixel data at each pixel element where the pixel data of the array of pixel elements collectively represent the image of the scene.

According to another embodiment of the present invention, an image sensing device includes an image sensor and a control circuit. The image sensor includes an array of pixel elements where the array includes at least two regions of pixels elements with each region including one or more pixel elements. The image sensor is configured to generate output signals at each pixel element as pixel data representing an image of a scene. The image sensor implements one or more control parameters where each control parameter modifies the sensitivity of the pixel elements in the array. The control circuit is configured to generate one or more control signals where each control signal varies a control parameter for a given region of pixel elements of the array. The one or more control signals are generated to vary the sensitivity of the pixels elements on a region by region basis within the array in accordance with the scene.

According to another aspect of the present invention, a method for sensing an image of a scene includes receiving incident light at an image sensing device where the image sensing device includes an array of pixel elements; providing multiple control parameters where each control parameter modifies the sensitivity of the pixel elements in the array; generating multiple control signals where each control signal controls a control parameter for the entire array of pixel elements and the multiple control signals are generated to vary the sensitivity of the pixels elements to provide continuous fine grain control of the sensitivity of the pixel elements in accordance with the scene; and generating output signals at the output of the image sensing device indicative of the pixel data at each pixel element, the pixel data of all pixel elements collectively representing the image of the scene.

According to yet another aspect of the present invention, an image sensing device includes an image sensor and a control circuit. The image sensor includes an array of pixel elements where the image sensor is configured to generate output signals at each pixel element as pixel data representing an image of a scene where the pixel data of all pixel elements collectively represent the image of the scene. The image sensor implements multiple control parameters where each control parameter modifies the sensitivity of the pixel elements in the array. The control circuit is configured to generate multiple control signals where each control signal controls a control parameter for the entire array of pixel elements. The multiple control signals are generated to vary the sensitivity of the pixels elements to provide continuous fine grain control of the sensitivity of the pixel elements in accordance with the scene.

DETAILED DESCRIPTION OF THE PREFERRED EMBODIMENTS

Figure 1:
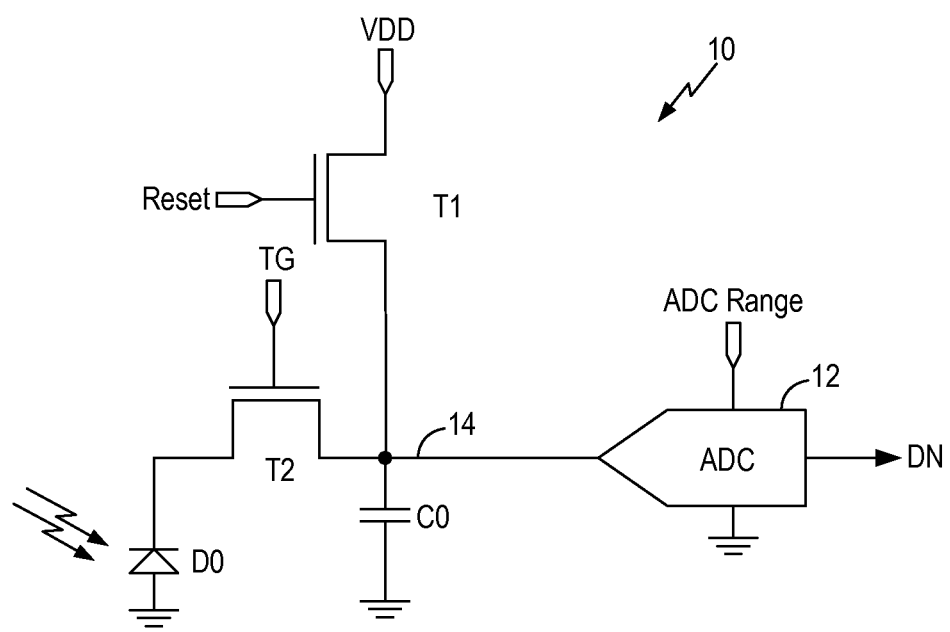
FIG. 1 is a schematic diagram of a conventional basic image sensing system.

According to one aspect of the present invention, an image sensor implementing a regional sensitivity control method applies dynamic control of one or more control parameters to the pixel array on a region by region basis within the image sensor. The one or more control parameters modify the sensitivity of the pixels. By adjusting the lighting performance of the image sensor on a region by region basis, the regional sensitivity control method achieves a higher dynamic range with lower artifacts as compared to the conventional method where the sensitivity is controlled by a single parameter for the entire array. In some embodiments, a region is a subset of the pixel array and the subset can include different number of pixels, such as from substantially the entire pixel array down to a single pixel. In other words, the regional sensitivity control method can be implemented on groups of pixels or on a pixel-by-pixel basis. The regional sensitivity control method can be applied to any of the existing image sensor architectures described above, including CCD image sensors, CMOS APS image sensors and DPS image sensors, or to image sensor architecture to be developed.

More specifically, an image sensor, or an image sensing device, may be exposed to a scene including bright portions and low-lit portions. By implementing the regional sensitivity control method of the present invention, the part of the image sensor exposed to bright light will use one level of sensitivity while the part of the image sensor exposed to low light will use another level of sensitivity selected according to the lighting conditions. The regional sensitivity control method of the present invention realizes region by region control of one or more sensitivity setting (for example, the conversion gain) to enhance the dynamic range of the image sensor. Furthermore, in some embodiments, the regional sensitivity control method of the present invention combines different dynamic range enhancement techniques to obtain the desired sensitivity settings, allowing for the fine tuning of the sensitivity of the image sensor on a region by region basis.

Although improved performance in dynamic range can be obtained using conventional techniques, the improvements are limited due to the fact that a sensitivity setting is changed for the entire sensor array. So for example, when gain is set high for low illumination scenes, details can be lost for bright objects in that scene. Another shortcoming of conventional dynamic range enhancement approaches is that most of the conventional approaches implement only two or three gross values for the single control parameter being changed. Therefore, the values will often not be correct for a large percentage of the high dynamic range scene, resulting in high noise and lost detail. The regional sensitivity control method of the present invention overcomes these and other shortcomings of the conventional approaches. By providing region by region control of the sensitivity of the image sensor, the dynamic range of the image sensor can be extended while maintaining low noise and retaining image details.

According to another aspect of the present invention, a circuit and method for providing fine grain control of the sensitivity of an image sensor or an image sensing device is realized by dynamically adjusting multiple control parameters for the entire image sensor array. More specifically, in some embodiments, a fine tune sensitivity control method varies two or more control parameters to allow continuous fine grain control of the sensitivity of the image sensing device over a range of sensitivity values. The fine tune sensitivity control method realizes many advantages over conventional methods. First, the fine tune sensitivity control method of the present invention allows a continuous control of the scene brightness on pixel data coming out of the image sensor, before any digital processing is applied. Thus, a smoothly varying noise level is obtained as opposed to the abrupt changes in signal level and noise obtained in the conventional methods due to transitions between two gross states of gain values. Lastly, by providing continuous and fine grain control of the sensitivity of the image sensor, the method of the present invention improves intra-scene dynamic range of an image.

In the present description, for a fixed implementation of an image sensor with defined pixel size, Quantum Efficiency (QE), and noise levels in absence of blooming, the sensitivity of the image sensor is inversely related to the well capacity of the pixels of the image sensor such that when controls such as changing the size of the charge-to-voltage conversion capacitor, ADC voltage range or changing the gain level before the ADC converter are exercised to decrease the sensitivity of the pixel, the well capacity is likewise increased. Likewise, as the same controls are exercised to increase the sensitivity of the pixel, the well capacity is likewise decreased. As described above, the well capacity or the "full well" of the pixel refers to the maximum number of electrons detectable by a pixel. The well capacity of the pixel is a function of the charge storage size of the photodiode, the capacitance at the sense node, the voltage swing of the readout circuitry, or limited by the highest digital number which can be generated by the ADC.

In accordance with the present invention, the regional sensitivity control method applies dynamic control of one or more sensitivity control parameter based on different regions of the image sensor while the fine tune sensitivity control method applies dynamic control of multiple sensitivity control parameters to the entire pixel array. In some embodiments, the control parameters under dynamic control include: 1) the photodiode size, 2) the size of capacitor C0 for charge-to-voltage conversion, which is equivalent to changing the conversion gain, 3) the analog gain prior to analog-to-digital conversion, and 4) the analog-to-digital converter (ADC) operating voltage range. For instance, the photodiode or photodetector size can be varied by varying the size of the photodetector in each pixel or by selecting an alternate sized photodetector in each pixel.

A salient feature of the sensitivity control methods of the present invention is that when multiple control parameters are adjusted, continuous adjustment and fine grain control of the sensitivity of the image sensor are realized. In other words, by adjusting multiple control parameters, continuous adjustment of the well capacity of the image sensor is realized. This is contrary to the known solutions when only one parameter is modified between two levels to allow only two discrete sensitivity levels to be used.

Accordingly, the regional and fine tune sensitivity control methods of the present invention adjust the sensitivity and therefore the well capacity of the image sensing device dynamically to adapt to changing lighting conditions. For example, in very bright lighting conditions, a photodiode can be combined with a larger capacitor for lower charge-to-voltage conversion and a wider ADC operating range to realize a less sensitive pixel. As the light level decreases, the sensitivity control methods of the present invention dynamically adjust the control parameters to provide the optimal sensitivity and well capacity to adapt to the changing lighting conditions, to provide a more sensitive pixel. The dynamic adjustment of the control parameters allow the sensitivity of the pixel to be modified for different lighting conditions, from extremely bright light to extremely low light levels.

As described above, as a pixel of a fixed image sensor implementation is increased in sensitivity, it has a lower well capacity but also more noise, and when the pixel sensitivity is decreased, the well capacity is large, but the sensor is more immune to noise. Under the sensitivity control methods of the present invention, when the image sensor is exposed to a bright light condition, the sensitivity control methods operate to tune the pixels to a large well capacity level to decrease the sensitivity but improve noise. When the image sensor is exposed to a low light condition, the sensitivity control methods operate to tune the pixels to a small well capacity level to increase the sensitivity with acceptable noise. When the image sensor is exposed to an intermediate lighting condition, the sensitivity control methods operate to tune the pixels to have a sensitivity and well capacity suitable for the intermediate lighting condition.

In some embodiments, the regional and fine tune sensitivity control methods are implemented in a DPS image sensor performing pixel level analog-to-digital conversion. A CMOS image sensor with pixel level analog-to-digital conversion is described in U.S. Pat. No. 5,461,425 of B. Fowler et al. ("the '425 patent"), incorporated herein by reference in its entirety. Such an image sensor, referred to as a digital pixel sensor (DPS), provides a digital output signal at each pixel element representing the light intensity detected by that pixel element. The combination of a photodetector and an analog-to-digital (A/D) converter in an area image sensor helps enhance detection accuracy and reduce power consumption, and improves overall system performance. The DPS image sensor architecture can be implemented using a dedicated-ADC scheme where each pixel is coupled to a dedicated analog-to-digital converter. The DPS image sensor architecture can also be implemented using a shared-ADC scheme where an analog-to-digital converter is associated with or shared by a group of two or more neighboring pixels. In one embodiment, the sensitivity control method is implemented in a DPS image sensor using a shared-ADC scheme. In the following description, a conventional DPS image sensor with a shared-ADC architecture is first described. Then, the implementation of the sensitivity control method of the present invention in the DPS image sensor is illustrated.

Figure 2:
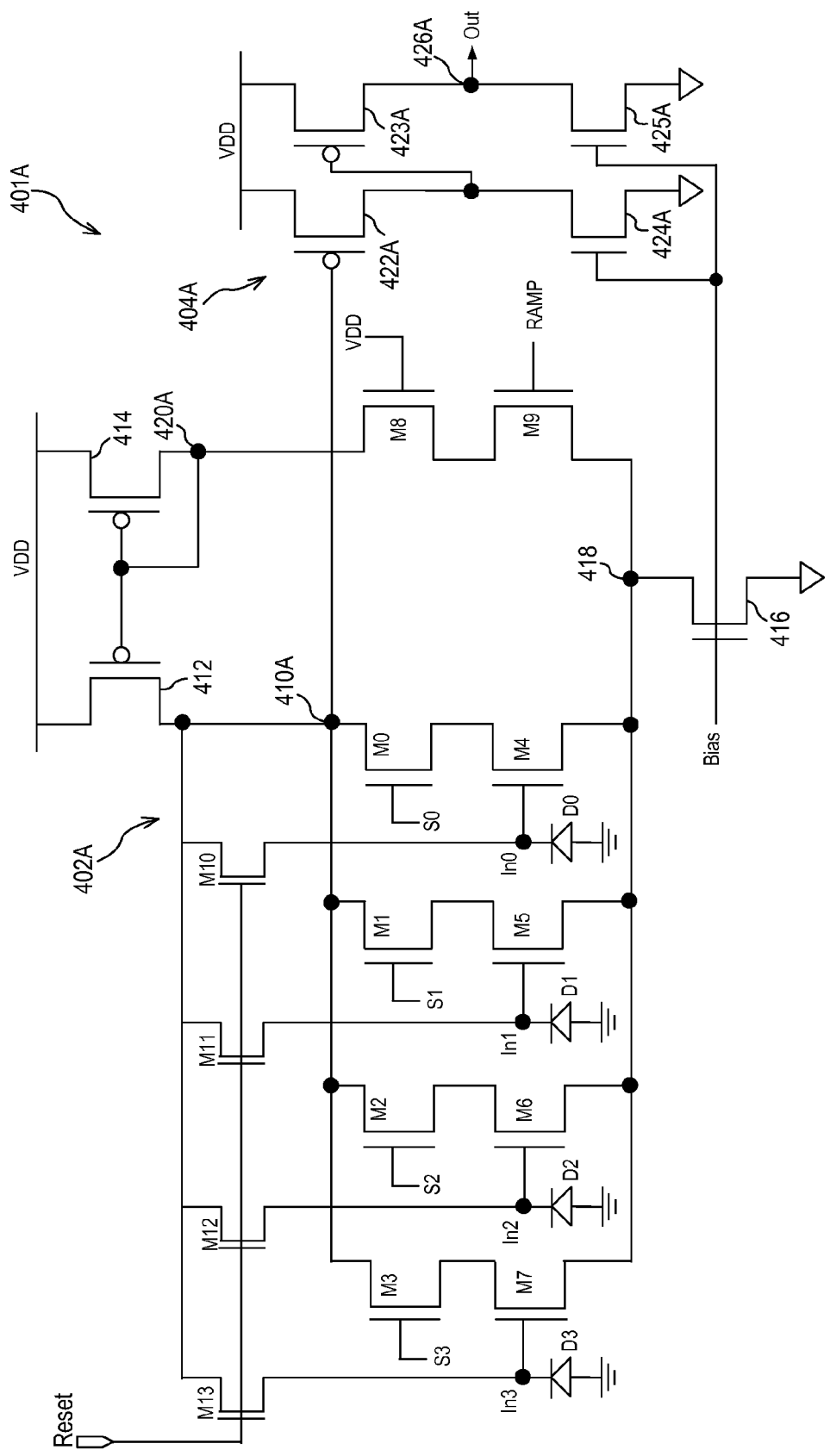
FIG. 2 duplicates FIG. 8A of U.S. Pat. No. 6,788,237 and is a circuit diagram illustrating a DPS pixel block implementing the shared-ADC scheme.

FIG. 2 duplicates FIG. 8A of U.S. Pat. No. 6,788,237 and is a circuit diagram illustrating a DPS pixel block implementing the shared-ADC scheme. More specifically, FIG. 2 illustrates a DPS image sensor where four photodiodes (pixels) D0 to D3 are configured to share a single ADC circuit. A comparator 401A incorporating an input multiplexer is used to realize the sharing of one ADC circuit among four photodiodes. Referring to FIG. 2, comparator 401A includes two stages. The first stage includes a differential pair 402A, a current mirror formed by PMOS transistors 412 and 414, and a bias transistor 416. Differential pair 402A includes transistors M0 to M7 forming the first branch of the differential pair and transistors M8 and M9 forming the second branch. Transistor 416 is an NMOS transistor coupled between a node 418 and ground and having its gate terminal controlled by a Bias voltage signal. Transistor 416 provides a reference current at node 418. The output signal (node 410A) of differential pair 402A is coupled to a buffer 404A forming the second stage of comparator 401A.

Buffer 404A is implemented as a two-stage amplifier including PMOS transistor 422A biased by NMOS transistor 424A in the first stage and PMOS transistor 423A biased by NMOS transistor 425A in the second stage. Transistors 424A and 425A are driven by the Bias voltage signal. Buffer 404A in comparator 401A is used to provide buffering or amplification of the output signal from differential pair 402A. Buffer 404A can be implemented as an inverting buffer or a non-inverting buffer depending on design choice.

In the present illustration, the DPS image sensor implements shared-ADC scheme by sharing one ADC circuit with four pixels or four photodiodes. Accordingly, the first branch of differential pair 402A includes four input signal paths and incorporates an input multiplexer for selecting one of the four input signal paths for comparison with the RAMP signal received at the second branch of the differential pair. The RAMP signal defines the operating voltage range of the ADC. Specifically, transistors M0 to M3, controlled by input select signals S0 to S3, function as an input multiplexer for enabling one of the four input signal paths. As illustrated in FIG. 2, serially connected transistors M0 and M4 form one input signal path for receiving analog input signal In0 generated by a photodiode D0. Similarly, serially connected transistor pairs M1 and M5, M2 and M6, and M3 and M7 form a second, third and fourth input signal paths for receiving analog input signals In1, In2 and In3 generated by photodiodes D1, D2 and D3, respectively. In operation, at any one time, only one of input select signals S0-3 is enabled (at a logic high level) for turning on one of transistors M0 to M3. Then, the analog input signal of the selected input signal path is available at node 410A for comparison with the RAMP signal. The four-to-one configuration shown in FIG. 2 is illustrative only and the shared-ADC scheme can be implemented for share one ADC with any number of analog input signals or photodiode signals.

In the present illustration, the second branch of differential pair 402A includes a pair of serially connected NMOS transistors M8 and M9. The gate terminal of transistor M8 is connected to the VDD voltage. Therefore, transistor M8 remains turned on in operation and provides a resistive load for transistor M9 which receives the RAMP input signal. Transistor M8 is included in differential pair 402A to equalize the resistive load at both branches of the different pair (that is, at nodes 410A and 420A) so that effective comparison can be performed. Because the input signal path in the first branch includes two NMOS transistors connected in series, the input signal path in the second branch also needs to have the same number of equally sized transistors. Of course, other method for equalizing the resistive load at the first and second branches of differential pair 402A can be used, such as by appropriately sizing transistor M9 or by providing a resistor in lieu of transistor M8. Furthermore, the gate terminal of transistor M8 can be connected to a reference voltage other than the VDD voltage as long as the reference voltage is sufficiently high to turn the transistor on. In that case, the input select signals S0 to S3 will also rise to the same reference voltage when the respective signal is to be turned on (i.e., at a logic high level).

The output signal of differential pair 402A (node 410A) is coupled to buffer 404A for amplification and/or inversion. The output signal (node 426A) of buffer 404A is a digital value representative of the analog signal being digitized.

In a digital pixel sensor incorporating pixel level ADC, a reset operation is performed after an image is captured to reduce the comparator offset voltage. Analog autozeroing operation is also performed during the reset operation which has the effect of reducing fixed pattern noise and 1/f noise. In the present illustration, the reset operation is incorporated in the ADC by providing a reset transistor for each input signal paths in the comparator of the ADC. More specifically, to incorporate the reset operation in comparator 401A, NMOS transistors M10 to M13, acting as reset transistors, are included in comparator 401A and are each coupled between node 410A and the respective analog input terminals of the input signal path. Thus, transistor M10 is coupled between node 410A and the gate terminal of transistor M4 receiving analog input signal In0. Similarly, transistors M11 to M13 are coupled between node 410A and the respective gate terminals of transistors M5 to M7, receiving analog input signals In1 to In3. Reset transistors M10 to M13 are controlled by the same Reset signal generated by control circuitry external to the ADC. Therefore, photodiodes D0 to D3 are reset at the same time. Of course, it is possible to provide different reset signals to each of reset transistors M10 to M13 so that photodiodes D0 to D3 are individually reset.

Figure 3:
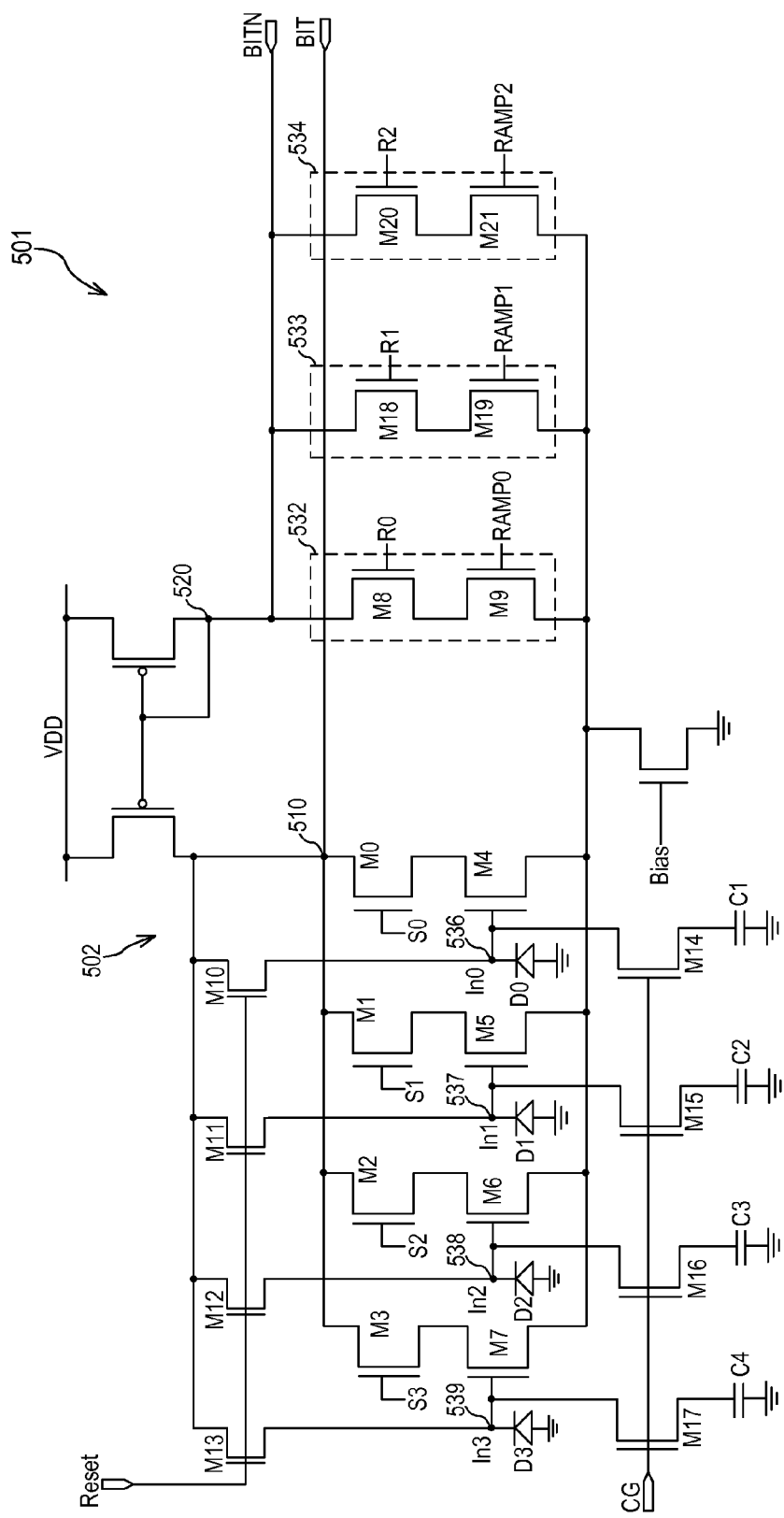
FIG. 3 is a schematic diagram of a DPS pixel block with a shared-ADC scheme and incorporating the fine tune or regional sensitivity control method according to one embodiment of the present invention.

In one embodiment of the present invention, the fine tune or regional sensitivity control method of the present invention is implemented in a DPS image sensor with a shared-ADC scheme. FIG. 3 is a schematic diagram of a DPS pixel block with a shared-ADC scheme and incorporating the fine tune or regional sensitivity control method according to one embodiment of the present invention. In particular, the DPS pixel block of FIG. 2 has been enhanced with additional circuitry to implement the sensitivity control methods of the present invention.

In the present embodiment, the fine tune image sensitivity control method realizes dynamic control of at least two or more of the following control parameters. First, multiple ADCs, or comparator circuits for the ADC, are integrated into the pixel with different voltage ranges to provide control over the ADC operating voltage range. Second, the capacitor for charge-to-voltage conversion at each photodiode is implemented using a capacitor with variable capacitance between two or more values to provide control over the conversion gain. In one exemplary embodiment, the fine tune image sensitivity control method is implemented using three ADCs with voltage ranges of 0-250 mV, 0-768 mV and 0-2V along with two capacitors for charge-to-voltage conversion. In the present embodiment, one capacitor is fifteen times the capacitance of the other capacitor such that their combined capacitance is sixteen times the capacitance of the small capacitor alone. Other values of capacitors are possible resulting in different ratios of sensitivity.

Referring to FIG. 3, a DPS pixel block implements the shared-ADC scheme by sharing a single ADC circuit among four photodiodes D0 to D3. A comparator 501 incorporating an input multiplexer is used to realize the sharing of one ADC circuit among four photodiodes. The construction of the DPS pixel block in FIG. 3 is substantially similar to the DPS pixel block in FIG. 2 and like elements are given like reference numerals and will not be further described. However, comparator 501 incorporates modifications to implement the fine tune sensitivity control method of the present invention to allow the DPS image sensor to have fine grain control over the well capacity or the sensitivity of the image sensor.

More specifically, control over the ADC operating voltage range is realized by providing multiple ADC for each pixel or in each pixel block. In comparator 401A of FIG. 2, differential pair 402A includes a single signal path (serially connected NMOS transistors M8 and M9) for the second branch implementing a single ADC operating voltage range defined by the RAMP signal. However, in FIG. 3, the digital pixel block implements fine tune sensitivity control by providing multiple signal paths 532-534 for the second branch of the differential pair 502 in comparator 501. Each signal path 532-534 is provided with a different RAMP signal RAMP0, RAMP1, and RAMP2. Since the RAMP signal defines the ADC operating voltage range, providing multiple second branch signal paths 532-534 with different RAMP signals provides control of the ADC operating voltage range of the DPS image sensor. In practice, signal paths 532-534 realizes the logical function of multiple ADCs in the pixel block with different ADC operating voltage ranges.

Each of signal paths 532-534 is constructed of two serially connected NMOS transistors, one transistor receiving the respective select signal and the other transistor receiving the respective RAMP signal. NMOS transistors M8, M18 and M20 are the select transistors for each signal path receiving respective select signals R0, R1 and R2. NMOS transistors M9, M19 and M21 receive the respective RAMP signals RAMP0, RAMP1, and RAMP2 implementing different ADC operating voltage range. It would be possible to use only one RAMP signal with the RAMP signal value determined outside the pixel, however, such an implementation would use separate wiring per region for the RAMP signal. In one embodiment, RAMP0, RAMP1, and RAMP2 implement voltage ranges 0-250 mV, 0-768 mV and 0-2V, respectively. At any given time, only one of select signals R0, R1 and R2 is enabled (driven to Vdd) to select one of the ADC operation voltage range RAMP0, RAMP1, and RAMP2 for use in the comparator circuit 501.

Control over the charge-to-voltage conversion or the conversion gain is realized by providing variable capacitance at the sense node of each pixel. Referring to FIG. 3, the charge-to-voltage conversion process in the DPS pixel is normally determined by the capacitance at the sense node (nodes 536-539) of the pixel (referred to as the "sense node capacitance"). The sense node capacitance is normally formed by the gate capacitance of transistors M4, M5, M6, and M7, connected to the photodiodes D0 to D3 respectively, and the nodes electrically connected to the sense nodes. In accordance with the fine tune sensitivity control method of the present invention, capacitors C1, C2, C3, and C4 are introduced to respective sense nodes 536-539 through NMOS transistors M14, M15, M16 and M17. Select transistors M14, M15, M16 and M17 are controlled by a control signal CG coupled to the gate terminals of the transistors. When signal CG is asserted, transistors M14, M15, M16, and M17 are turned on and the effective capacitance at the sense nodes 536-539 is increased by the value of capacitors C1, C2, C3, and C4. The capacitors C1, C2, C3, C4 and the select transistors M14, M15, M16 and M17 may be formed by any means realizable in the fabrication technology in which the image sensor is fabricated as long as elements appear electrically to be a capacitance to the sense nodes.

In some embodiments, the fine tune sensitivity control method of the present invention is applied and adjustments of the sensitivity control parameters (the ADC operating voltage range and the conversion gain) are applied globally to all pixels in the DPS image sensor. In that case, control signals CG, R0, R1, and R2 are applied globally to all the pixels in the pixel array. In other embodiments, the regional sensitivity control is applied and one or more sensitivity control parameters are modified on a region by region basis within the pixel array. Control signals CG, R0, R1, and R2 are shared by pixels in the same region and are separated from the control signals for different regions. Furthermore, in the embodiment shown in FIG. 3, two control parameters (the ADC operating voltage range and the conversion gain) are used. When the regional sensitivity control method is used, only one control parameter needs to be adjusted to obtain dynamic range improvements.

In one embodiment, the regional sensitivity control method is implemented by routing the control signals CG, R0, R1, and R2 out of the pixel array for each region. Routing the control signals in such a manner can be demanding on wiring resources of the image sensor. In another embodiment, a memory element is implemented inside the pixel array and the memory element is loaded from outside the pixel array on a region by region basis to implement regional sensitivity control.

Figure 4:
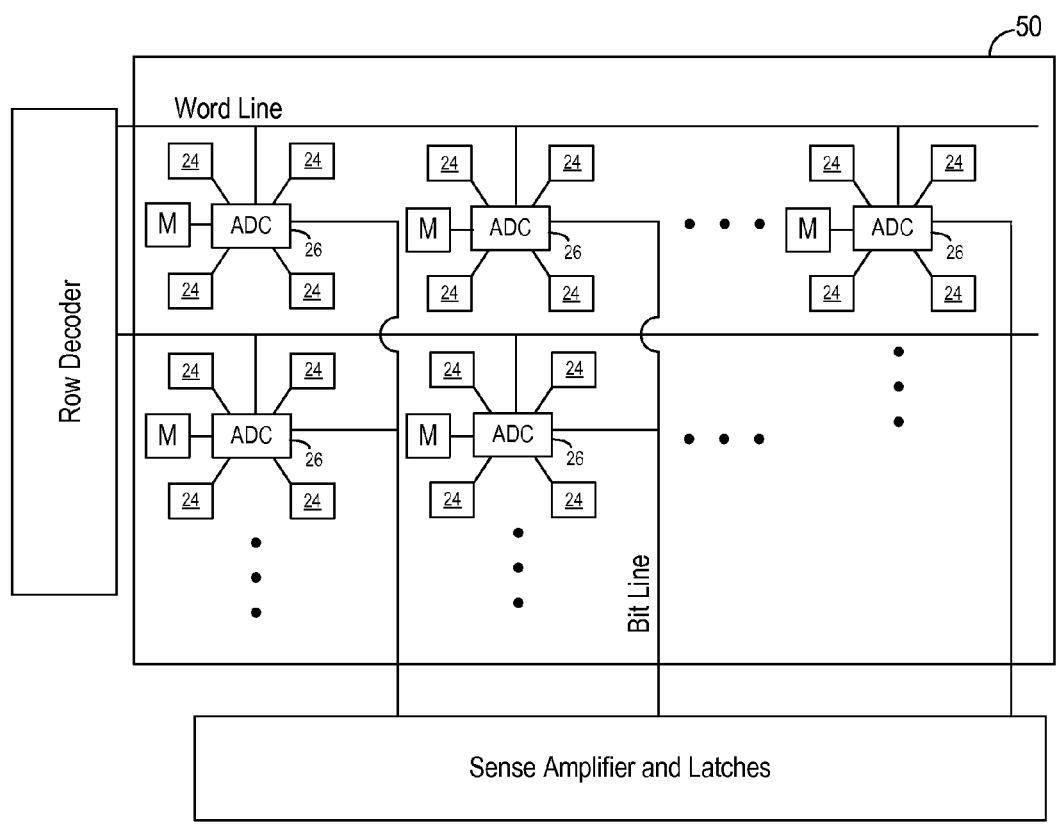
FIG. 4 is a schematic diagram of a DPS pixel array using a shared-ADC architecture and incorporating a memory element for regional sensitivity control according to one embodiment of the present invention.

FIG. 4 is a schematic diagram of a DPS pixel array using a shared-ADC architecture and incorporating a memory element for regional sensitivity control according to one embodiment of the present invention. Referring to FIG. 4, a pixel array 50 includes a two-dimensional array of DPS pixels configured using the shared-ADC scheme. In the present embodiment, four pixels 24 are connected to a single ADC 26 with a memory element M attached to provide the control signals for the regional sensitivity control. In one embodiment, memory element M is implemented a scannable memory element. In other embodiments, other equivalent memory circuitry can be used to provide the control signal programming and storage function. The memory element M can be a single bit of memory in which case the four ADCs are controlled as a single region with control signals CG, R0, R1, R2. Alternately, the memory element M can be implemented as a four-bit memory in which case each ADC within the group can be independently controlled as its own individual region.

Figure 5:
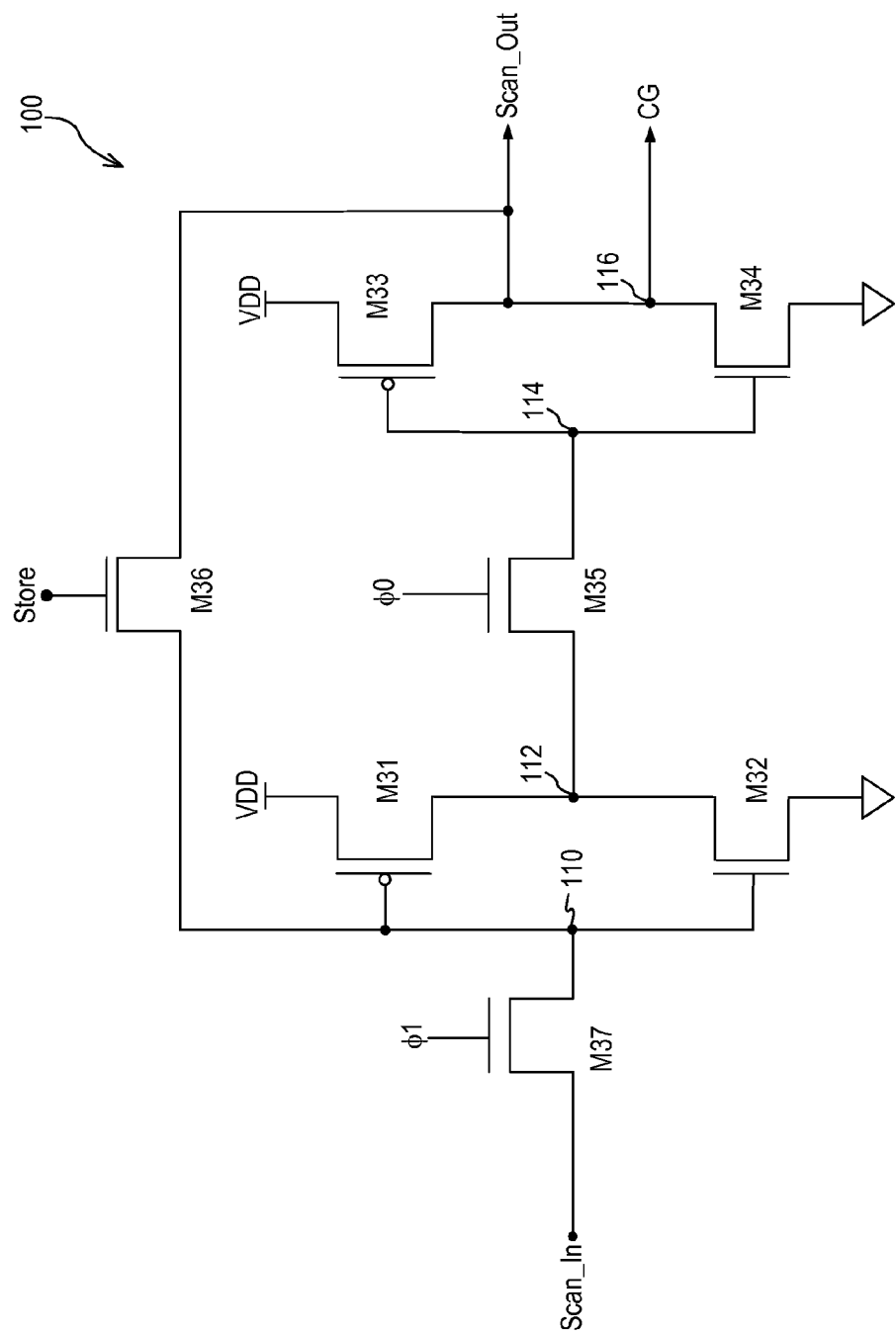
FIG. 5 illustrates a scannable memory element which can be incorporated inside the pixel array for use as the memory element for implementing regional sensitivity control according to one embodiment of the present invention.

FIG. 5 illustrates a scannable memory element which can be incorporated inside the pixel array for use as the memory element for implementing regional sensitivity control according to one embodiment of the present invention. Referring to FIG. 5, a memory element 100 is used to store control signal CG for a region of the pixel array. Memory element 100 receives input signals Scan_In, Store and also two clock signals φ0 and φ1. Memory element 100 generates output signals Scan_Out and control signal CG. In operation, when the signal Store and clock signal φ0 are set to a logical high value (such as the Vdd voltage) while clock signal φ1 is set to a logical low value (such as the ground voltage), transistors M35 and M36 are turned on while transistor M37 is turned off. As a result, transistors M1, M2 and M3, M4 are configured as two feedback inverters which operate to retain the data values stored on the respective gate terminals (nodes 110, 114) of the inverters. In this mode, a data value Scan_In previously provided to memory element 100 is stored.

When a new data value is to be stored in memory element 100 to update the control signal CG, the signal Store and clock signals φ0 and φ1 are initially all set to a logical low value (such as the ground voltage). Transistors M35, M36 and M37 are all turned off. A new value is driven onto the Scan_In input. Then, clock signal φ1 is driven to a logical high value (e.g. Vdd) and then driven to a logical low value again to turn on transistor M37 for a given duration. When transistor M37 is turned on, the new data value for Scan_In is transferred to the input gate capacitance of the inverter formed by transistors M31 and M32. At this point, the inverter of transistors M31 and M32 is isolated from the inverter of transistors M33 and M34 by virtue of transistors M35 and M36 being turned off. After the new data value has been written in, clock signal φ0 is driven to a logical high value (Vdd) and then back to a logical low value (ground) to transfer the output (node 112) of the first inverter to the input (node 114) of the second inverter formed by transistors M33, M34. At this point in the operation of the memory element 100, a new logic state appears at control signal CG.

Subsequently, a new value can be provided at the Scan_In input and propagated through the memory element as described above. Multiple memory elements 100 can be arranged to form a scan chain. When new logic states have propagated to all of the memory elements in the chain, the signal Store is asserted to a logical high value to turn on transistor M36, thereby configuring the two inverters in a feedback loop to lock the scanned in data values in the memory element. The newly scanned in data values of a chain of memory elements are then stored in a static configuration.

When a DPS image sensor implements the fine tune or regional sensitivity control method of the present invention as described above, the effect of utilizing two conversion gains controlled via signal CG and three ADC operating voltage ranges controlled by signals R0, R1, and R2 allow the selection of a wide range of pixel sensitivities and well capacities.

Figure 6:
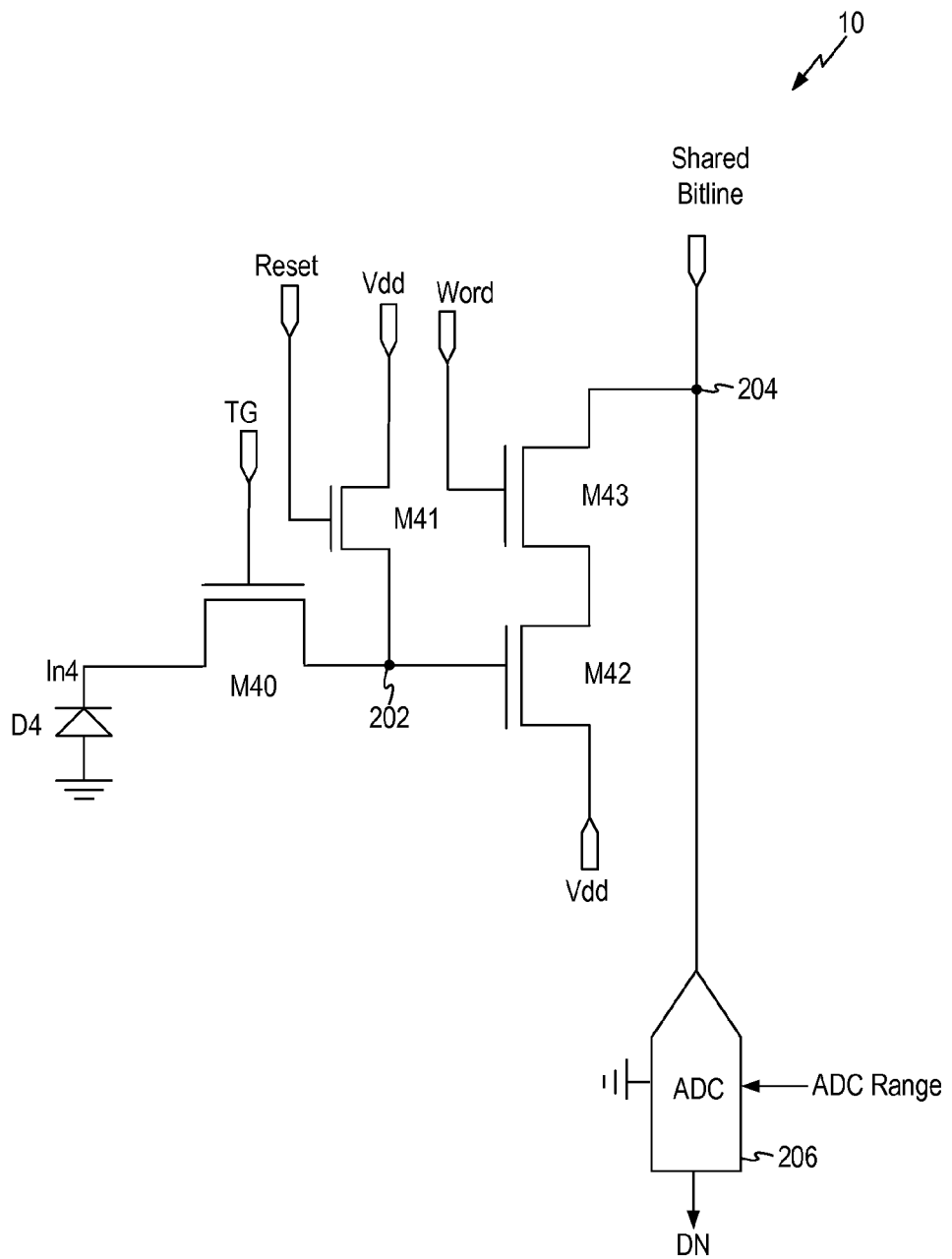
FIG. 6 is a schematic diagram of a conventional CMOS APS pixel.

According to another embodiment of the present invention, the fine tune or regional sensitivity control method is implemented in a CMOS APS image sensor. FIG. 6 is a schematic diagram of a conventional CMOS APS pixel. Referring to FIG. 6, a CMOS APS pixel 200 includes a photodiode D4 providing an analog input voltage In4 to a transfer gate formed by transistor M40. The sense node 202 of the APS pixel is connected to reset transistor M41 for resetting the pixel and also to the output circuitry including output transistor M42 and word line transistor M43. When word line transistor M43 is turned on by the gate control signal Word, the analog voltage stored on the sense node 202 turns on transistor M42 to pass the pixel voltage onto a shared bitline 204. Shared bitline 204 is coupled to an analog-to-digital converter (ADC) 206 which receives an ADC operating voltage range and operates to digitize the pixel voltage on bitline 204 into a digital number.

Figure 7:
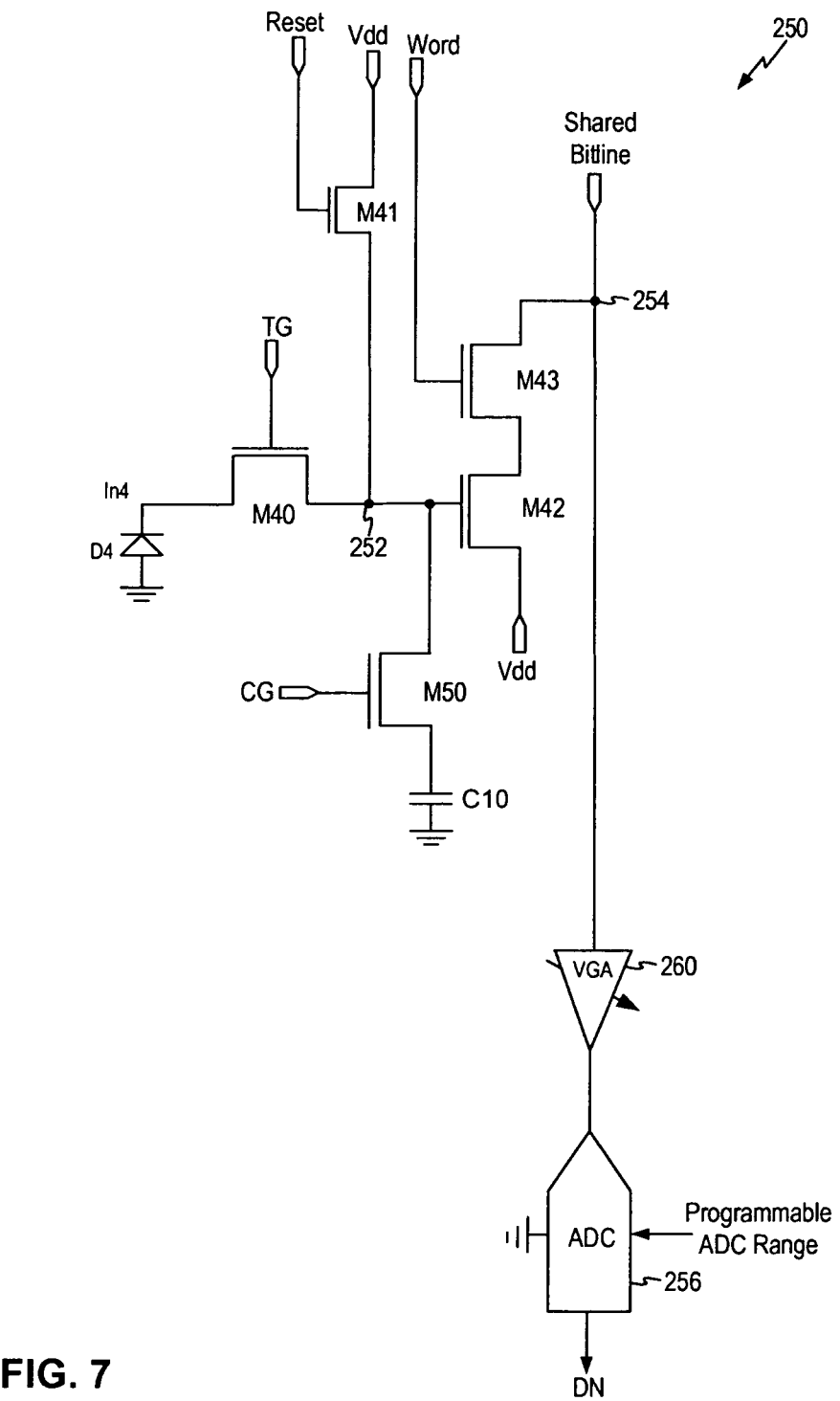
FIG. 7 is a schematic diagram of a CMOS APS pixel implementing the fine tune or regional sensitivity control method according to one embodiment of the present invention.

FIG. 7 is a schematic diagram of a CMOS APS pixel implementing the fine tune or regional sensitivity control method according to one embodiment of the present invention. To realize fine grain sensitivity control, the basic APS pixel of FIG. 6 is modified to provide control over the conversion gain, the analog gain before the ADC, and the ADC operating voltage range. Like elements in FIGS. 6 and 7 are given like reference numerals to simplify the discussion. Referring to FIG. 7, a CMOS APS pixel 250 includes a photodiode D4 providing an analog input voltage In4 to a transfer gate formed by transistor M40. The sense node 252 is reset by the reset transistor M41. The pixel voltage is passed to the shared bitline 254 through transistor M42 and word line transistor M43.

In some embodiments, to implement fine tune sensitivity control, a transistor M50 and a capacitor C10 are added to APS pixel 250 to extend the conversion gain. That is, two capacitance values for the charge-to-voltage conversion capacitor are now realized in APS pixel 250. The first capacitance value is the capacitance at the sense node 252 while the second capacitance is the combined capacitance of the sense node and capacitor C10. Furthermore, a variable gain amplifier (VGA) 260 is coupled to bitline 254 to provide a variable gain to the analog pixel voltage before analog-to-digital conversion. Finally, programmable ADC operating voltage range can be provided to ADC 256 to provide control over the ADC operation voltages.

In other embodiments, the control parameters (conversion gain, analog gain, ADC operating voltage range) can be applied to the entire APS pixel array or the parameters can be dynamically changed on a region-by-region basis to realize dynamic range extension. For instance, the regional sensitivity control method can be realized by dynamically changing the variable gain of the VGA 260 as the individual pixels are converted or by dynamically changing the voltage range of the ADC 256 as individual pixels are being converted to digital numbers.

It is instructive to note that specific embodiments of the method of the present invention as applied to a CMOS APS architecture may require additional circuit elements such as analog CDS (correlated double sampling) applied prior to the VGA to accommodate reset spread caused by KTC (thermal) noise or other reset phenomenon. It is understood that other circuitry may be needed to complete the APS pixel array as is understood by one skilled in the art and FIG. 7 is illustrative only and is not intended to illustrate a complete APS pixel.

Figure 8:
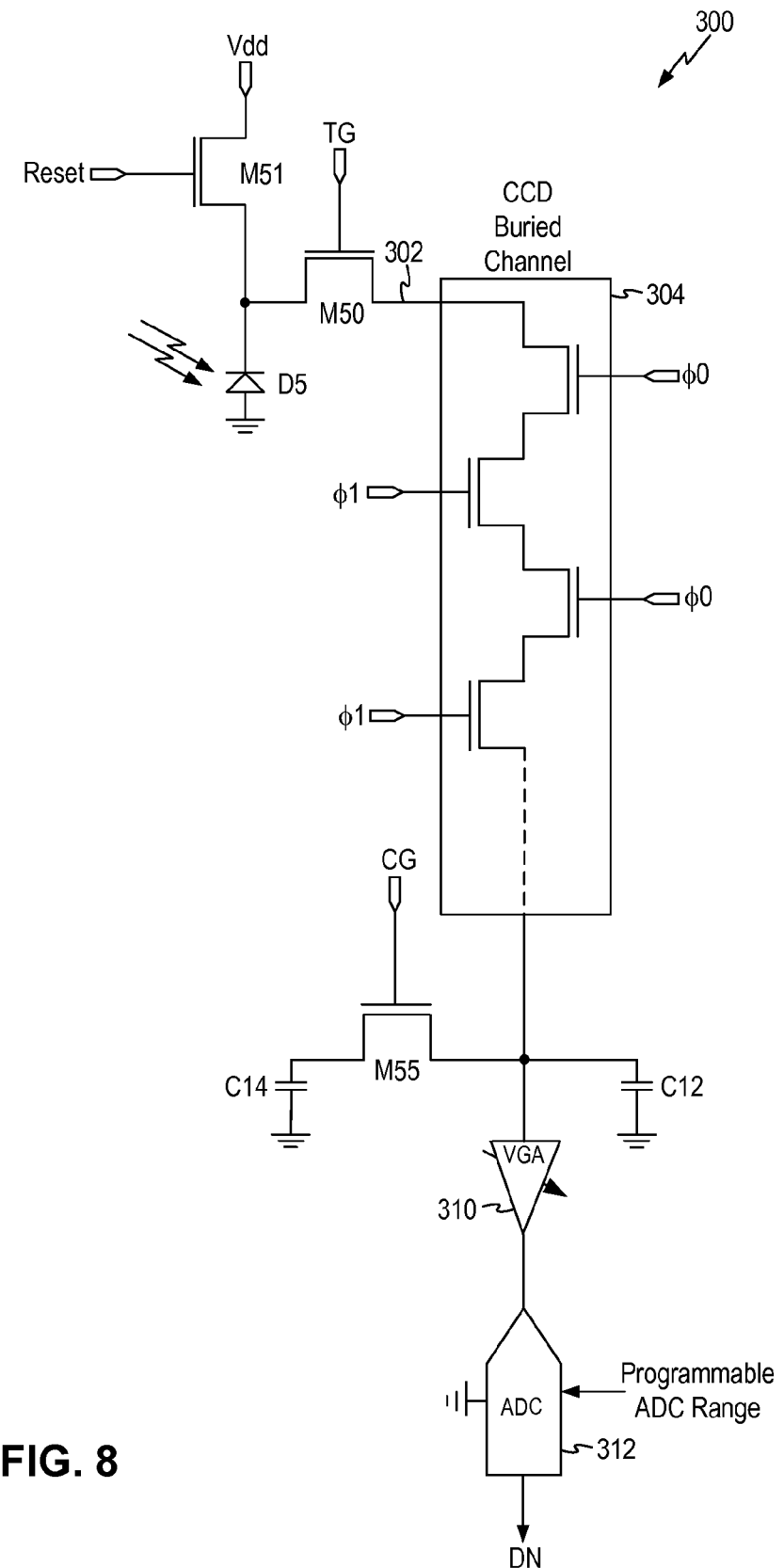
FIG. 8 is a schematic diagram of a CCD image sensor implementing the fine tune or regional sensitivity control method according to one embodiment of the present invention.

According to yet another embodiment of the present invention, the fine tune or regional sensitivity control method is implemented in a CCD image sensor. FIG. 8 is a schematic diagram of a CCD image sensor implementing the fine tune or regional sensitivity control method according to one embodiment of the present invention. In a CCD image sensor, the photodiode turns light into electrons which are scanned out of the pixel array via vertical and horizontal chains of MOS capacitors, often in a buried channel.

Referring to FIG. 8, a CCD pixel 300 includes a photodiode D5 coupled to a CCD buried channel 304 through a transfer gate M50. When the exposure time is complete, signal TG is asserted to turn on transfer transistor M50 to move a packet of electrons collected by photodiode D5 to a node 302 coupled to CCD readout buried channel 304. The clock signals φ0 and φ1 are used to move packets of electrons sequentially down the buried channel analog shift registers. The electron packets are eventually converted to a voltage at the sense node 306 connected to a capacitor C12.

In some embodiments, the fine tune sensitivity control method of the present invention is implemented in the CCD pixel 300 by adding a transistor M55 and a capacitor C14 to the sense node to extend the conversion gain, by introducing a variable gain amplifier (VGA) 310 to vary the analog gain, or by providing a programmable ADC voltage range to ADC 312. In other embodiments, the control signal CG driving the transistor M55, the VGA 310 and the ADC operating voltage range to ADC 312 are controlled on a region by region basis by dynamically changing the control values as the packets of electrons are scanned out of the CCD pixel array by the clock signals (φ0 and φ1.

In some of the above described embodiments, the circuits implementing the control parameters upon which control is exerted to modify the sensitivity of the pixel array shown incorporated in the pixel array. For example, the additional capacitors and the additional signal paths for changing the ADC operating range are shown incorporated in the comparator 501 of the pixel array. In other embodiments, the circuits implementing the control parameters may reside outside of the pixel array, as appropriate for the various sensor architectures. The control parameters may be generated based upon scene content, such as derived from the content of previous frames of pixel data, or the control parameters may be generated from predetermined settings based on a given usage of the image sensing device.

In the above described embodiments, a control circuit is provided in the digital image sensing device to generate the control signals for controlling the control parameters for modifying the sensitivity of the image sensor. The control circuit may be a standalone circuit or it can be implemented as part of the digital image processor of the digital imaging system. The digital image processor of the digital imaging system can be configured to generate the control signals. The control circuit may be integrated with the digital image sensing device or it can be formed on a separate integrated circuit. Many configurations of the control circuit are possible. In one embodiment, the control circuit uses scene content information from one or more previous frames to determine regional and fine-tuning gain settings for the current frame.

The above detailed descriptions are provided to illustrate specific embodiments of the present invention and are not intended to be limiting. Numerous modifications and variations within the scope of the present invention are possible. The present invention is defined by the appended claims.

We claim:

1. A method for sensing an image of a scene, comprising:
receiving incident light at an image sensing device, the image sensing device comprising an array of pixel elements, the array comprising at least two regions of pixels elements, each region comprising one or more pixel elements;
providing one or more control parameters, each control parameter modifying the sensitivity of the pixel elements in the array;
generating one or more control signals, each control signal for varying a control parameter for a given region of pixel elements of the array, the one or more control signals being generated to vary the sensitivity of the pixels elements on a region by region basis within the array in accordance with the scene;
generating output signals at the output of the image sensing device indicative of the pixel data at each pixel element, the pixel data of the array of pixel elements collectively representing the image of the scene; and
storing the one or more control signals for each control parameter in one or more memory elements located in the array adjacent to the one or more pixel elements.

2. The method of claim 1, wherein the image sensing device comprises a one-dimensional or two-dimensional array of pixel elements.

3. The method of claim 1, wherein providing one or more control parameters comprises: providing circuitry implementing the one or more control parameters within the array.

4. The method of claim 1, wherein providing one or more control parameters comprises: providing circuitry implementing the one or more control parameters outside of the array.

5. The method of claim 1, wherein generating one or more control signals comprises: generating a first set of control signals for controlling a set of control parameters for a first region of pixel elements in the array; and generating a second set of control signals for controlling the set of control parameters for a second region of pixel elements in the array, wherein each of the first and second regions of pixel elements comprises one or more pixel elements of the array.

6. The method of claim 1, wherein generating one or more control signals, each control signal for varying a control parameter for a given region of pixel elements of the array, comprises: generating a control signal to vary a control parameter modifying a size of a photodetector in each pixel.

7. The method of claim 1, wherein generating one or more control signals, each control signal for varying a control parameter for a given region of pixel elements of the array, comprises: generating a control signal to control a control parameter modifying a capacitance value used for performing charge-to-voltage conversion in each pixel element.

8. The method of claim 1, wherein generating one or more control signals, each control signal for varying a control parameter for a given region of pixel elements of the array, comprises: generating a control signal to vary a control parameter modifying an analog gain in each pixel.

9. The method of claim 1, wherein generating one or more control signals, each control signal for varying a control parameter for a given region of pixel elements of the array, comprises: generating a control signal to vary a control parameter modifying an operating voltage range of an analog-to-digital converter in the image sensing device.

10. The method of claim 1, wherein generating one or more control signals comprises generating the one or more control signals to vary the sensitivity of the pixel elements in the array on a region by region basis in accordance with a lighting level in the scene.

11. The method of claim 1, wherein generating one or more control signals comprises generating the one or more control signals to vary the sensitivity of the pixel elements in the array on a region by region basis in accordance with a content of the scene determined from previous frames of pixel data or determined from predetermined settings.

12. The method of claim 1, further comprising: generating a digitized pixel voltage signal indicative of the output signal of each pixel element.

13. The method of claim 12, wherein generating a digitized pixel voltage signal comprises: generating the digitized pixel voltage signal at each pixel element within the array.

14. The method of claim 1, wherein generating one or more control signals, each control signal for varying a control parameter for a given region of pixel elements of the array, comprises: selecting an alternate sized photodetector in each pixel.

15. The method of claim 1, wherein generating one or more control signals comprises:
generating a plurality of control signals for controlling two or more control parameters for each given region of pixel elements of the array to provide continuous fine grain control of the sensitivity of the pixel elements of the image sensing device.

16. An image sensing device, comprising:
an image sensor comprising an array of pixel elements, the array comprising at least two regions of pixels elements, each region comprising one or more pixel elements, the image sensor being configured to generate output signals at each pixel element as pixel data representing an image of a scene, the image sensor implementing one or more control parameters, each control parameter modifying the sensitivity of the pixel elements in the array; and
a control circuit configured to generate one or more control signals, each control signal for varying a control parameter for a given region of pixel elements of the array, the one or more control signals being generated to vary the sensitivity of the pixels elements on a region by region basis within the array in accordance with the scene, and
wherein the image sensor further comprises one or more memory elements, each memory element being associated with and located adjacent to the one or more pixel elements in the array, each memory elements being configured to store the control signal for each control parameter.

17. The image sensing device of claim 16, wherein the control circuit is fabricated on the same integrated circuit as the image sensing device.

18. The image sensing device of claim 16, wherein the control circuit is fabricated on an integrated circuit separate from the image sensing device.

19. The image sensing device of claim 16, wherein the control circuit generates the one or more control signals in accordance with a content of the scene determined from previous frames of pixel data or determined from predetermined settings.

20. The image sensing device of claim 16, wherein each of the pixel elements comprises a photodetector generating an output signal, and the image sensing device further comprises: a plurality of analog-to-digital conversion (ADC) circuits configured to convert the output signal from each pixel element to a digitized pixel voltage signal.

21. The image sensing device of claim 20, wherein the plurality of analog-to-digital conversion (ADC) circuits are located within the array of pixel elements, each of the ADC circuits being connected to one or more photodetectors for converting the output signal of each pixel element to a digitized pixel voltage signal.

22. The image sensing device of claim 16, wherein the image sensor comprises a one-dimensional or two-dimensional array of pixel elements.

23. The image sensing device of claim 16, wherein the image sensor comprises circuitry implementing the one or more control parameters within the array.

24. The image sensing device of claim 16, wherein the image sensor comprises circuitry implementing the one or more control parameters outside of the array.

25. The image sensing device of claim 16, wherein the control circuit is configured to generate a first set of control signals for controlling a set of control parameters for a first region of pixel elements in the array and a second set of control signals for controlling the control parameters for a second region of pixel elements in the array, each of the first and second regions of pixel elements comprising one or more pixel elements in the array.

26. The image sensing device of claim 16, wherein the control circuit is configured to generate a first control signal to control a first control parameter modifying a size of a photodetector in each pixel.

27. The image sensing device of claim 16, wherein the control circuit is configured to generate a second control signal to control a second control parameter modifying a capacitance value used for performing charge-to-voltage conversion in each pixel 28. The image sensing device of claim 16, wherein the control circuit is configured to generate a third control signal to control a third control parameter modifying an analog gain in each pixel 29. The image sensing device of claim 16, wherein the control circuit is configured to generate a fourth control signal to control a fourth control parameter modifying an operating voltage range of an analog-to-digital converter in the image sensing device 30. The image sensing device of claim 16, wherein the control circuit is configured to generate the one or more control signals to vary the sensitivity of the pixel elements in the array on a region by region basis in accordance with a lighting level the scene.

31. The image sensing device of claim 16, wherein the image sensor comprises a digital image sensor selected from the group of a CMOS APS image sensor, a CCD image sensor and a DPS image sensor.

32. The image sensing device of claim 16, wherein the control circuit is configured to generate a first control signal to control a first control parameter selecting an alternate sized photodetector in each pixel.

33. The image sensing device of claim 16, wherein the image sensor implements two or more control parameters and the control circuit generates a plurality of control signals for controlling the two or more control parameters to provide continuous fine grain control of the sensitivity of the pixel elements of the image sensing device.

* * * * *